(12) United States Patent
Hu et al.

(10) Patent No.: US 7,518,806 B2
(45) Date of Patent: Apr. 14, 2009

(54) LENS MODULE

(75) Inventors: Chao-Chang Hu, Tainan (TW); Han-Wei Su, Tainan (TW); Wen-I Wu, Tainan (TW)

(73) Assignee: Industrial Technology Research Institute, Hsinchu (TW)

( * ) Notice: Subject to any disclaimer, the term of this patent is extended or adjusted under 35 U.S.C. 154(b) by 41 days.

(21) Appl. No.: 11/683,442

(22) Filed: Mar. 8, 2007

(65) Prior Publication Data

US 2008/0144191 A1    Jun. 19, 2008

(30) Foreign Application Priority Data

Dec. 15, 2006    (TW) .............................. 95147053 A

(51) Int. Cl.
*G02B 15/14*    (2006.01)

(52) U.S. Cl. ...................... 359/696; 359/698; 359/699; 359/704

(58) Field of Classification Search ................. 359/798, 359/823, 824, 694–704; 396/71, 137, 144
See application file for complete search history.

(56) References Cited

U.S. PATENT DOCUMENTS 6,922,525 B2 *    7/2005    Lee .............................. 396/71
2005/0286880 A1 *    12/2005    Lee .............................. 396/71

FOREIGN PATENT DOCUMENTS

KR    20050000663    1/2005
KR    20050008011    1/2005

* cited by examiner

*Primary Examiner*—Mohammed Hasan
(74) *Attorney, Agent, or Firm*—Jianq Chyun IP Office

(57) ABSTRACT

A disclosed lens module includes a zooming actuator, a cam, an auto-focusing actuator and at least two sets of lenses. The cam is coupled to and driven by the zooming actuator. The cam 104 has at least two tracks. The auto-focusing actuator is coupled to and moved along one of the tracks of the cam. One of the sets of lenses is coupled to and driven by the auto-focusing actuator. Another one of the sets of lenses is coupled to the another track of the cam.

27 Claims, 5 Drawing Sheets

LENS MODULE

CROSS-REFERENCE TO RELATED APPLICATION

This application claims the priority benefit of Taiwan application serial no. 95147053, filed on Dec. 15, 2006. All disclosure of the Taiwan application is incorporated herein by reference.

BACKGROUND OF THE INVENTION

1. Field of the Invention

The present invention generally relates to a lens module, and more particularly, to a miniaturized lens module capable of continuous focusing with different focus lengths.

2. Description of Related Art

Along with the progress of the communication industry, mobile phones have been broadly used by the people. Nowadays, a person owns one or more mobile phones; even children or seniors use the mobile phone for communicating with relatives. Accordingly, a great demand on handsets is obvious and is progressively growing. As a consequence, the handset market is overwhelmingly growing.

Along with the development of the multimedia technology, more and more handsets with additional functions, such as photographing function and video-graphing function, are now become general requisite functions of a handset. To meet the present compactness, flatness and thinness trend, the optical system and actuator of a built-in camera has to be designed as simple and compact as possible.

Accordingly, the camera module in a handset is limited to have the auto-focusing and zooming in steps functions only. For example, the lenses of the lens module in some handsets are driven by a cam, wherein an auto-focusing is available at the wide-end and the tele-end thereof. During a continuous zooming, for example, from the wide-end to the tele-end, there is no auto-focusing function for an intermediate zoom magnification at all.

In order to realize continuous zooming, i.e. auto-focusing function covering different focal lengths, the tracks of the above-mentioned cam must have a complex structure, which would increase the cam diameter, and therefore it would difficult achieved present trend of miniaturization.

The Korean Patents KR 10-0526652 and KR 10-0542074 disclose such a zooming scheme using a motor to indirectly or directly drive a barrel cam with groove tracks. According to the Korean patents however, it is difficult to have an auto-focusing function, unless the auto-focusing function is provided at the wide-end or tele-end thereof only by designing the groove tracks of the barrel cam. But the scheme is difficult to realize the auto-focusing covering all different focus length sections.

SUMMARY OF THE INVENTION

Accordingly, the present invention provides a structure of a lens module, which is capable of greatly reducing the size of the lens module and achieve auto-focusing covering all different focus length sections to achieve the continuous zooming function.

The present invention provides a lens module, which includes a zooming actuator, a cam having at least two tracks, an auto-focusing actuator and at least two sets of lenses. The cam is coupled to and driven by the zooming actuator. The auto-focusing actuator is coupled to and moved along one of the tracks of the cam. One of the sets of lenses is coupled to and moved by the auto-focusing actuator. Another one of the sets of lenses is coupled to another one of the tracks of the cam.

The present invention provides a lens module, which includes a zooming actuator, a cam having a first track and a second track, an auto-focusing actuator and a first and second sets of lenses. The cam is coupled to and driven by the zooming actuator. The auto-focusing actuator is coupled to and moved along the second track of the cam. The first set of lenses is couple to and moved along the first track. The second set of lenses is coupled to and moved by the auto-focusing actuator.

The lens module comprises a holding unit, wherein the zooming actuator and the cam are installed in the holding unit, and the auto-focusing actuator and the sets of lenses are moveably disposed in the holding unit.

The present invention provides a lens module, which includes a holding unit, a zooming actuator installed in the holding unit, a cam having at least two tracks installed in the holding unit, at least two sets of movable lenses, an auto-focusing actuator installed in the holding unit, and a set of zooming actuator. The cam is coupled to and driven by the zooming actuator. The at least two sets of movable lenses are disposed in the holding unit and respectively coupled to the tracks for moving along the tracks. The set of focusing lenses is coupled to and moved by the auto-focusing actuator.

According to an embodiment of the present invention, the zooming actuator of the lens module comprises a tiny motor, including for example, a stepping motor, an ultrasonic motor or a piezoelectric actuator.

According to an embodiment of the present invention, the auto-focusing actuator of the lens module includes a voice coil motor, an electromagnetic actuator or a piezoelectric actuator.

According to an aspect of the present invention, different components in the lens module are respectively employed for controlling the zooming and focusing, so that the cam controls only the zooming tracks of the lenses. Thus, the design of the cam can be simplified and the overall cost can be effectively reduced.

According to an aspect of the present invention, the cam simultaneously drives to move the lenses and the auto-focusing actuator. Therefore, in addition to moving along the zooming track, the lenses are also moved by the auto-focusing actuator so that the lens module is able to conduct auto-focusing within any the focus length section. Furthermore, for the case where the auto-focusing actuator is disposed at the other lenses without being driven by a cam, the function of auto-focusing within any the focus length section can be achieved as well.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

The First Embodiment

Figure 1:
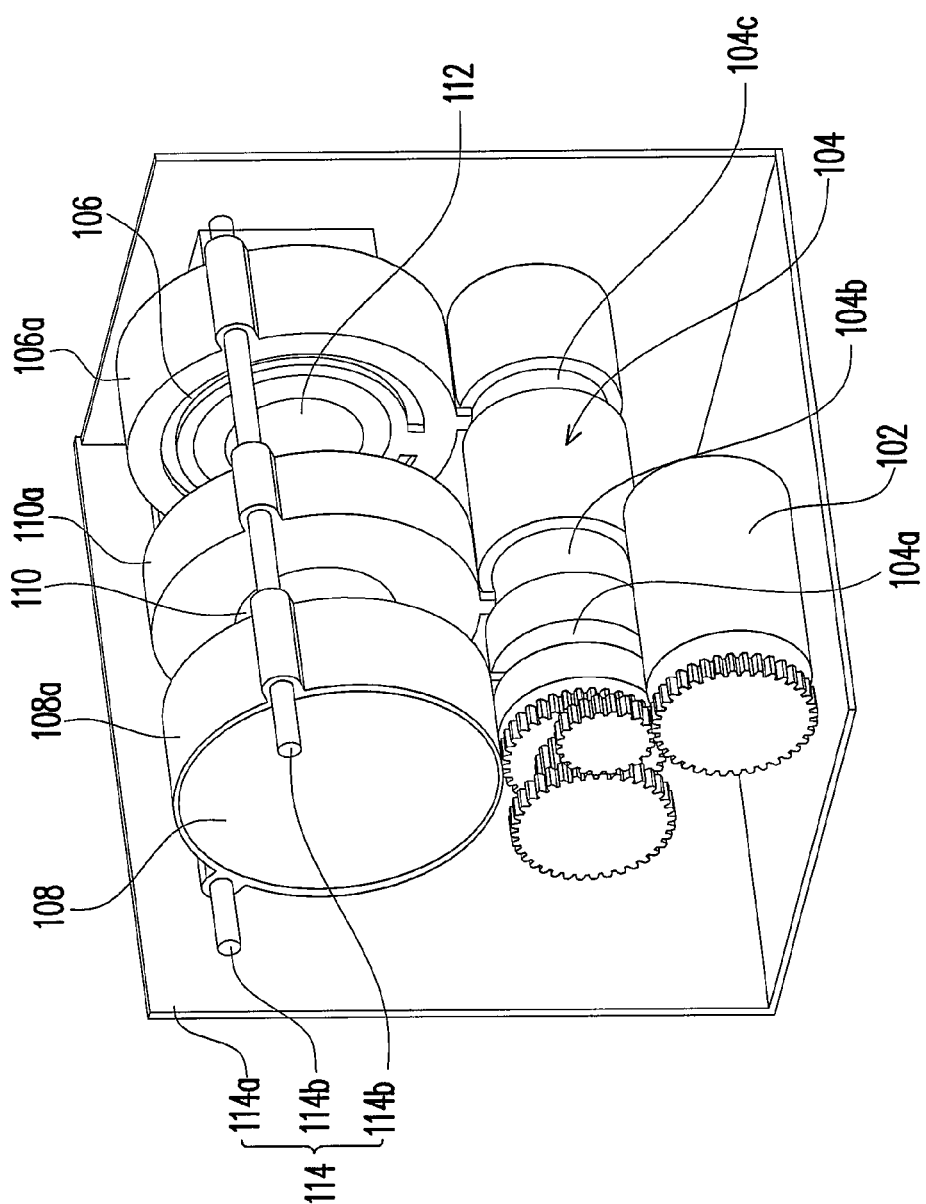
FIG. 1 is a schematic diagram of a lens module according to a first embodiment of the present invention.
Figure 2:
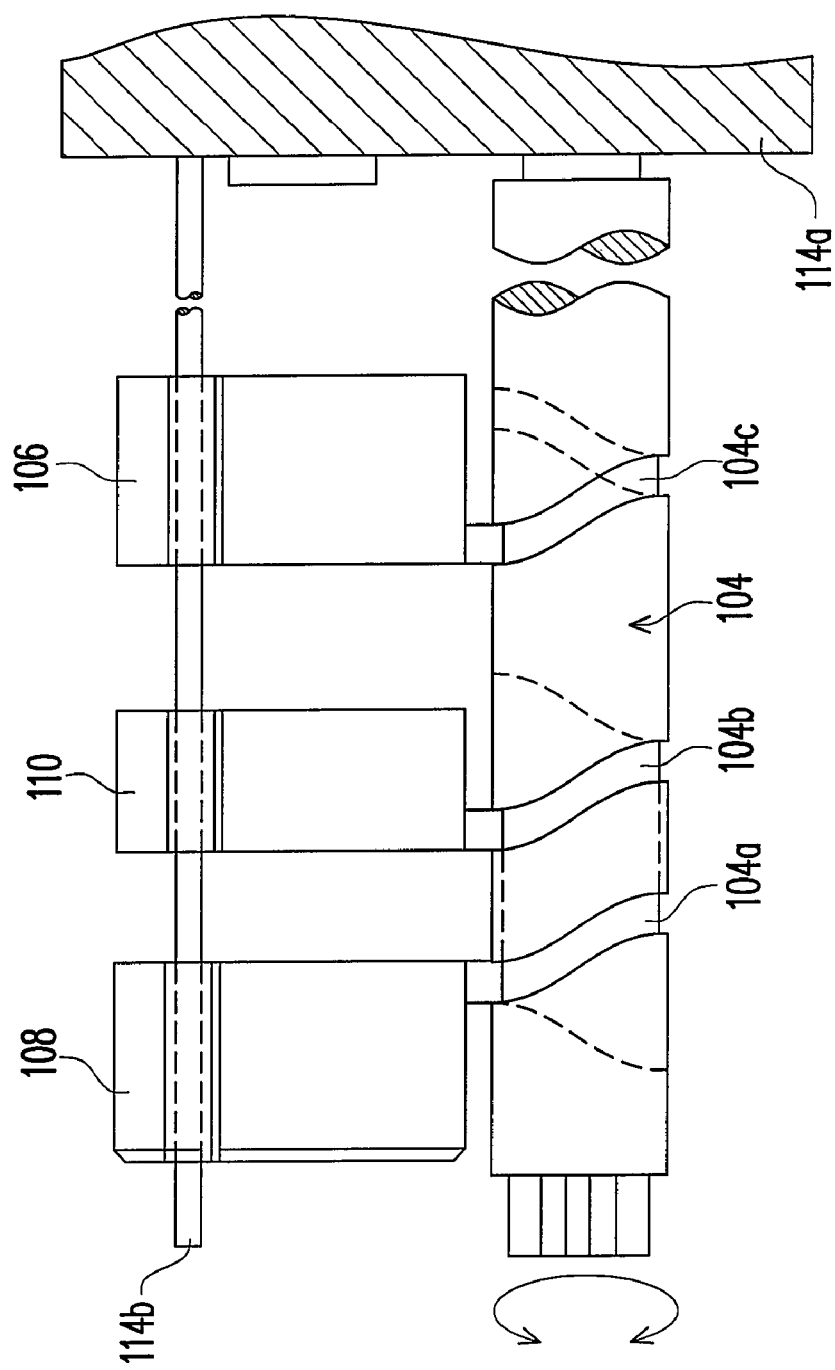
FIG. 2 is a front view of the lens module of FIG. 1 (the zooming actuator thereof is omitted herein).

Referring to FIGS. 1 and 2, FIG. 1 is a schematic diagram of a lens module according to a first embodiment of the present invention and FIG. 2 is a front view of the lens module of FIG. 1 (the zooming actuator thereof is omitted herein).

A lens module 100 includes a zooming actuator 102, a cam 104, an auto-focusing actuator 106, at least two sets of lenses 108, 110 and 112 (three sets of lenses are exemplarily shown herein and termed as a first set of lenses, a second set of lenses and a third set of lenses) and a holding unit 114.

The holding unit 114 includes a case 114a and a guiding rail 114b fixed in the case 114a and the guiding rail is, for example, a shaft.

The zooming actuator 102 is, for example, a tiny motor fixed in the case 114a of the holding unit 114, wherein the tiny motor may include a stepping motor, an ultrasonic motor or a piezoelectric actuator.

The cam 104 is installed in the case 114a of the holding unit 114, wherein the cam 104 is coupled to the zooming actuator 102 in gear engagement mode or in contact friction driving mode and the zooming actuator 102 drives to rotate the cam 104. The cam 104 has at least two tracks 104a, 104b and 104c (three tracks are exemplarily shown herein and termed as a first track, a second track and a third track).

The auto-focusing actuator 106 includes, for example, a voice coil motor, an electromagnetic actuator or a piezoelectric actuator. The auto-focusing actuator 106 has a mounting flange 106a, is movably disposed on the guiding rail 114b of the holding unit 114 through the mounting flange 106a and is coupled to the third track 104c of the cam 104 for moving therewith.

The third set of lenses 112 is mounted in and coupled to the auto-focusing actuator 106, and the auto-focusing actuator 106 drives to move the third set of lenses 112.

In this manner, the auto-focusing actuator 106 is driven by the cam 104 to move along the guiding rail 114b of the holding unit 114 for zooming, and the third set of lenses 112 is driven by the auto-focusing actuator 106 so as to move along the guiding rail 114b of the holding unit 114 for focusing.

The first set of lenses 108 and the second set of lenses 110 respectively have a mounting flange 110a and a mounting flange 108a. The first set of lenses 108 and the second set of lenses 110 are movably disposed on the guiding rail 114b of the holding unit 114 via the mounting flanges 110a and 108a. The first set of lenses 108 and the second set of lenses 110 are respectively coupled to the first track 104a and the second track 104b and move along the guiding rail 114b of the holding unit 114 along the first track 104a and the second track 104b.

In the above-mentioned first embodiment, the lens module includes three sets of lenses for the exemplary purpose only. In fact however, the lens module may include only two sets of lenses, which means the lens module allows having a set of lenses coupled to the auto-focusing actuator (the third set of lenses) and another set of lenses.

In the above-mentioned first embodiment, the auto-focusing actuator is coupled to the third set of lenses and drives the same for auto-focusing. However, the present invention does not limit thereto; the auto-focusing actuator may be coupled to any set of lenses depending on the optical design.

In the above-mentioned first embodiment, all the sets of lenses are described to be moveable for the exemplary purpose only. In fact however, a set of lenses can be fixed depending on the optical design requirement, as described in the following embodiment.

The Second Embodiment

Figure 3:
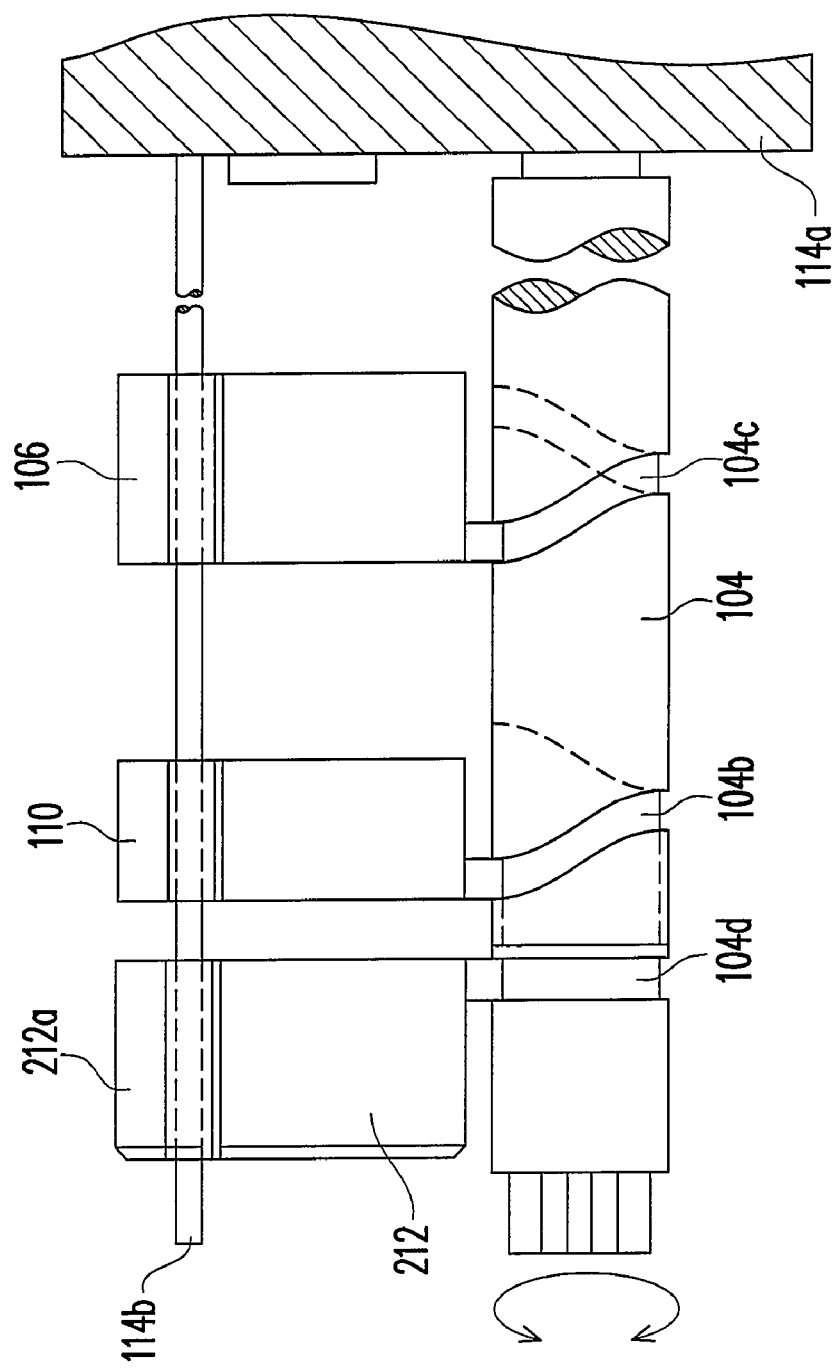
FIG. 3 is a front view of a lens module according to a second embodiment of the present invention.

FIG. 3 is a front view of a lens module according to the second embodiment of the present invention (the zooming actuator thereof is omitted herein). The same components are represented by a same symbol for simplicity.

Unlike the first embodiment, in the second embodiment one of the sets of lenses is fixed and others are moveable same as those in the first embodiment.

The set of fixed lenses 212 has a mounting flange 212a and is fixed at the case 114a of the holding unit 114 or the guiding rail 114b of the holding unit 114 through the mounting flange 212a. The set of fixed lenses 212 can be coupled to one of the tracks of the cam 104 as well, i.e. the track 104d, and in this case the track 104d would not make the set of fixed lenses 212 move along the guiding rail 114b of the holding unit 114 as well.

In the second embodiment, the first set of lenses 108 of the first embodiment is replaced by the set of fixed lenses 212 and the first track 104a is accordingly replaced by the track 104d. However, the present invention does not limit thereto. In fact, any set of lenses of the first embodiment can be replaced by the set of fixed lenses 212 depending on the optical design requirement.

Moreover, the auto-focusing actuator can be arranged at any one of the sets of lenses as well, which depends on the optical design requirement.

The Third Embodiment

Figure 4:
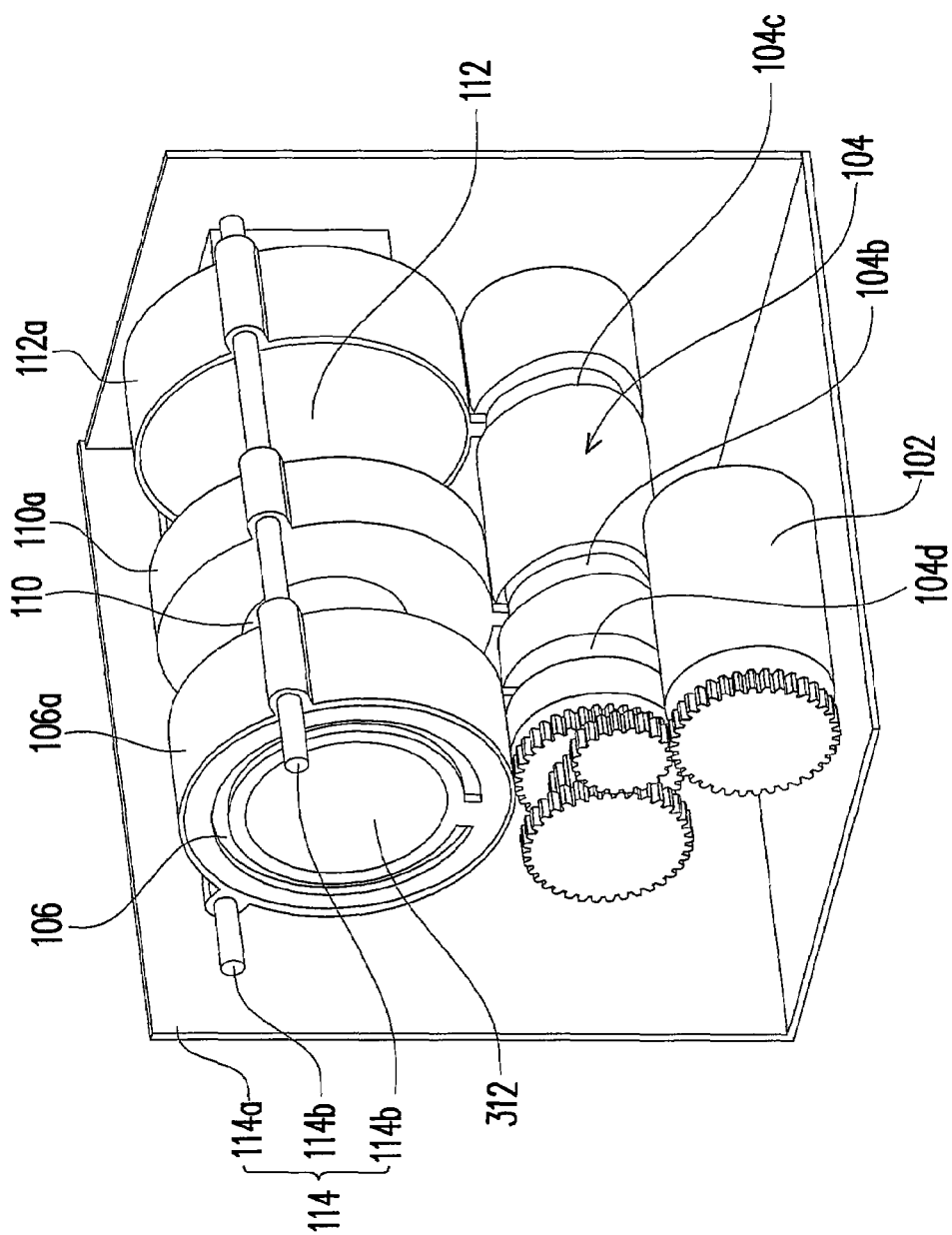
FIG. 4 is a schematic diagram of a lens module according to a third embodiment of the present invention.
Figure 5:
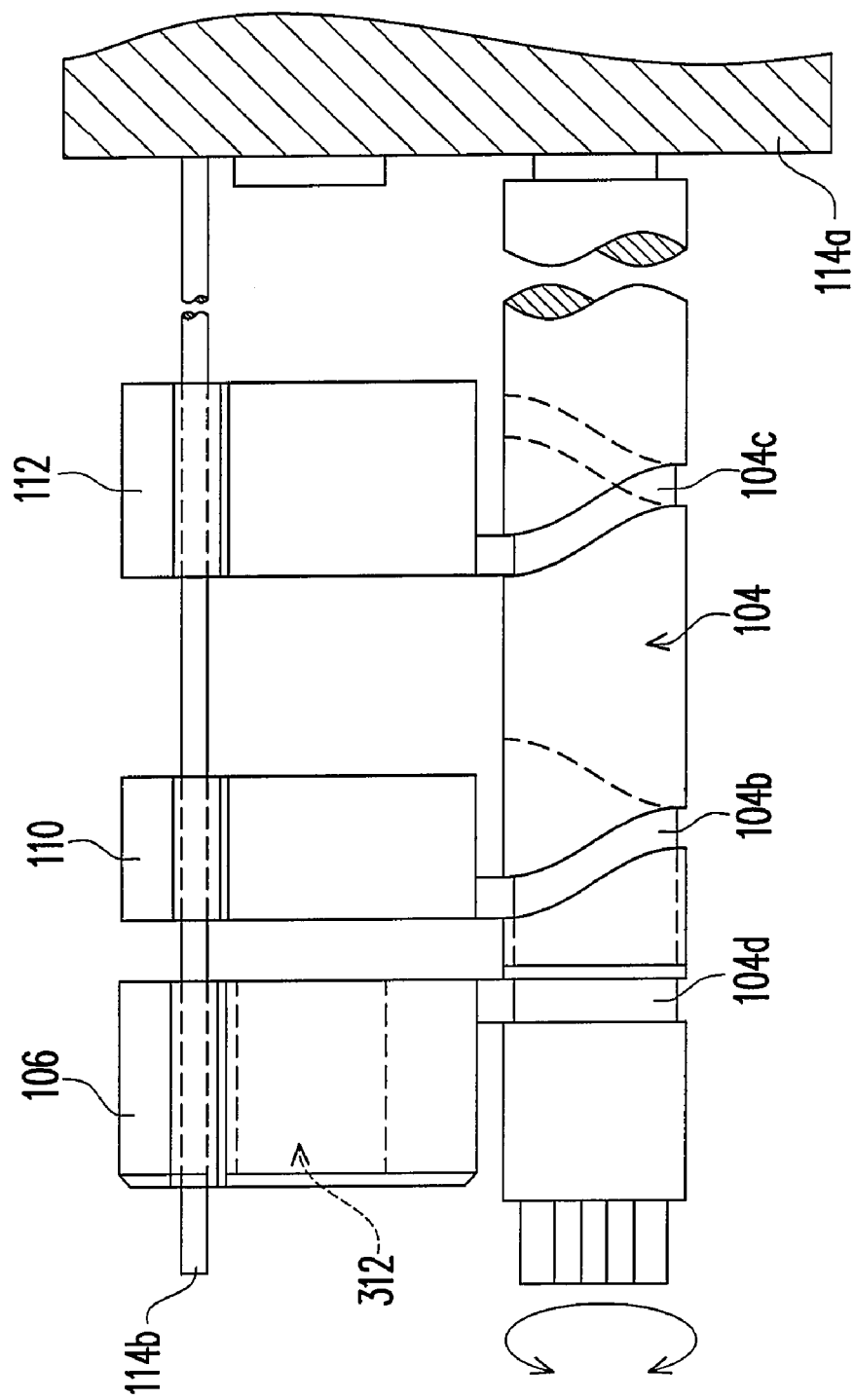
FIG. 5 is a front view of the lens module of FIG. 4 (the zooming actuator thereof is omitted herein).

FIG. 4 is a schematic diagram of a lens module according to a third embodiment of the present invention and FIG. 5 is a front view of the lens module of FIG. 4 (the zooming actuator thereof is omitted herein). The same components are represented by a same symbol for simplicity.

Unlike the first embodiment and the second embodiment, the auto-focusing actuator in the third embodiment is disposed at a fixed position of the holding unit, so that the auto-focusing actuator does not move along the guiding rail of the holding unit with the cam rotation.

In the embodiment, at least two sets of lenses, 110 and 112 (in the figure, two sets of lenses are given for the exemplary purpose only), are movably disposed on the guiding rail 114b of the holding unit 114. The sets of lenses 110 and 112 are respectively coupled to the track 104b and the track 104c and move along the guiding rail 114b of the holding unit 114 by respectively following the tracks 104b and 104c for zooming.

The auto-focusing actuator 106 has a mounting flange 106a and is installed in the case 114a of the holding unit 114 or on the guiding rail 114b of the holding unit 114 through the mounting flange 106a.

A set of focusing lenses 312 is mounted in the auto-focusing actuator 106 and accordingly coupled to the auto-focusing actuator. The set of focusing lenses 312 is driven by the auto-focusing actuator 106 for moving and focusing.

According to an aspect of the present invention, the cam provides the zooming tracks to control only the zooming, and thus simplify the tracks of the cam.

According to an aspect of the present invention, the zooming control and the focusing control are respectively implemented by the different components and the cam controls the zooming of the lenses, and therefore the cam design can be simplified, the cam diameter can be reduced, the cost can be reduced and the micromation of the handset can be realized.

According to an aspect of the present invention, an auto-focusing actuator is disposed in a set of zooming lenses, so that the cam not only drives the lenses for zooming, but also moves the auto-focusing actuator. In this way, the lens module is able to conduct auto-focusing in along any focus length section. Furthermore, in the case where the auto-focusing actuator is disposed at a set of lenses not driven by the cam (as the above-described third embodiment), the lens module provided by the present invention is able to realize the function of auto-focusing in any focus length section as well.

The lens module of the present invention can be applied not only in a handset, a common digital camera and a digital video camera, but also in a portable apparatus with an additional function, such as photographing or video photographing. In other words, the lens module of the present invention can be used in any miniaturization apparatus requiring photography function, video photography function or image-monitoring function.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A lens module, comprising:
a zooming actuator;
a cam, coupled to and driven by the zooming actuator, and the cam comprising at least two tracks;
an auto-focusing actuator, coupled to and moved along one of the tracks of the cam; and
at least two sets of lenses, wherein one of the sets of lenses is coupled to and moved by the auto-focusing actuator, and another one of the sets of lenses is coupled to one of the tracks of the cam.

2. The lens module according to claim 1, further comprising a holding unit, wherein the zooming actuator and the cam are installed in the holding unit, and the auto-focusing actuator and the sets of lenses are movably disposed in the holding unit.

3. The lens module according to claim 1, wherein one of the sets of lenses is mounted inside the auto-focusing actuator and coupled to the auto-focusing actuator.

4. The lens module according to claim 3, wherein the auto-focusing actuator has a mounting flange mounted in sliding manner in the holding unit and is moved by the cam to slide along the holding unit, and the set of lenses mounted inside the auto-focusing actuator is moved by the auto-focusing actuator for auto-focusing.

5. The lens module according to claim 2, wherein the holding unit comprises a case and a guiding rail fixed in the case, the zooming actuator and the cam are installed in the case and the auto-focusing actuator and one of at least the two sets of lenses are disposed on the guiding rail to move along the guiding rail.

6. The lens module according to claim 5, wherein the guiding rail comprises a shaft fixed in the case.

7. The lens module according to claim 1, further comprising a set of fixed lenses.

8. The lens module according to claim 1, wherein the zooming actuator is a tiny motor and the tiny motor comprises a stepping motor, an ultrasonic motor or a piezoelectric actuator.

9. The lens module according to claim 1, wherein the zooming actuator and the cam are coupled to each other in gear engagement mode or in contact friction driving mode.

10. The lens module according to claim 1, wherein the auto-focusing actuator comprises a voice coil motor, an electromagnetic actuator or a piezoelectric actuator.

11. A lens module, comprising:
a zooming actuator;
a cam, coupled to and driven by the zooming actuator, and the cam comprising a first track and a second track;
an auto-focusing actuator, coupled to and moved along the second track of the cam and; and
a first set of lenses and a second set of lenses, wherein the second set of lenses is coupled to and moved along the auto-focusing actuator, and the first set of lenses is coupled to and moved along the first track.

12. The lens module according to claim 11, further comprising a holding unit, wherein the zooming actuator and the cam are installed in the holding unit, and the auto-focusing actuator and the first set of lenses are movably disposed in the holding unit.

13. The lens module according to claim 11, wherein the second set of lenses is mounted inside the auto-focusing actuator and coupled to the auto-focusing actuator.

14. The lens module according to claim 13, wherein the auto-focusing actuator has a mounting flange mounted in sliding manner in the holding unit and is moved by the cam to slide along the holding unit, and the auto-focusing actuator moves the second set of lenses for auto-focusing.

15. The lens module according to claim 12, wherein the holding unit comprises a case and a guiding rail fixed in the case, the zooming actuator and the cam are installed in the case and the auto-focusing actuator and the first set of lenses are disposed on the guiding rail to respectively follow the second track and the first track for moving along the guiding rail.

16. The lens module according to claim 15, wherein the guiding rail is a shaft fixed in the case.

17. The lens module according to claim 11, further comprising a set of fixed lenses.

18. The lens module according to claim 11, wherein the zooming actuator is a tiny motor and the tiny motor comprises a stepping motor, an ultrasonic motor or a piezoelectric actuator.

19. The lens module according to claim 11, wherein the zooming actuator and the cam are coupled to each other in gear engagement mode or in contact friction driving mode.

20. The lens module according to claim 11, wherein the auto-focusing actuator comprises a voice coil motor, an electromagnetic actuator or a piezoelectric actuator.

21. A lens module, comprising:
a holding unit;
a zooming actuator, installed in the holding unit;
a cam, installed in the holding unit, and coupled to and driven by the zooming actuator, and the cam comprising at least two tracks,;
at least two sets of moving lenses, movably disposed in the holding unit, wherein the sets of moving lenses are respectively coupled to and moved along the tracks respectively;
an auto-focusing actuator, installed in the holding unit; and
a set of focusing lenses, coupled to and moved by the auto-focusing actuator.

22. The lens module according to claim 21, wherein the set of lenses is mounted inside the auto-focusing actuator and coupled to the auto-focusing actuator.

23. The lens module according to claim 22, wherein the auto-focusing actuator has a mounting flange fixed in the holding unit and the set of focusing lenses is driven by the auto-focusing actuator to move for auto-focusing.

24. The lens module according to claim 21, wherein the holding unit comprises a case and a guiding rail fixed in the case, and wherein the zooming actuator, the cam and the auto-focusing actuator are installed in the case and the sets of moving lenses are disposed on the guiding rail to move along the guiding rail.

25. The lens module according to claim 21, wherein the zooming actuator is a tiny motor and the tiny motor comprises a stepping motor, an ultrasonic motor or a piezoelectric actuator.

26. The lens module according to claim 21, wherein the zooming actuator and the cam are coupled to each other in gear engagement mode or in contact friction driving mode.

27. The lens module according to claim 21, wherein the auto-focusing actuator comprises a voice coil motor, an electromagnetic actuator or a piezoelectric actuator.

* * * * *